April 23, 1968 P. LIESENHOFF 3,379,422
APPARATUS FOR THE PURIFICATION OF GASES BY WET SEPARATION
Filed Nov. 23, 1964 2 Sheets-Sheet 1

April 23, 1968   P. LIESENHOFF   3,379,422
APPARATUS FOR THE PURIFICATION OF GASES BY WET SEPARATION
Filed Nov. 23, 1964   2 Sheets-Sheet 2
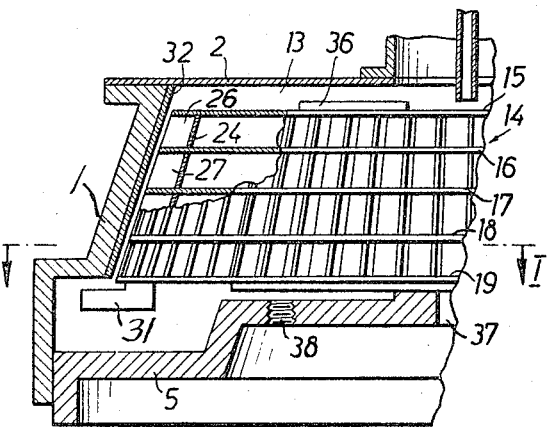
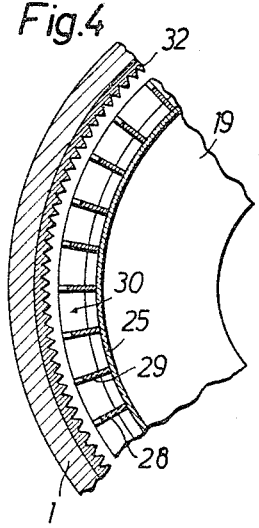
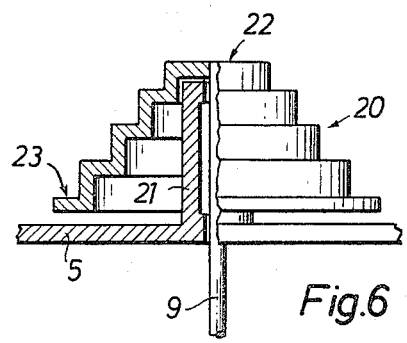
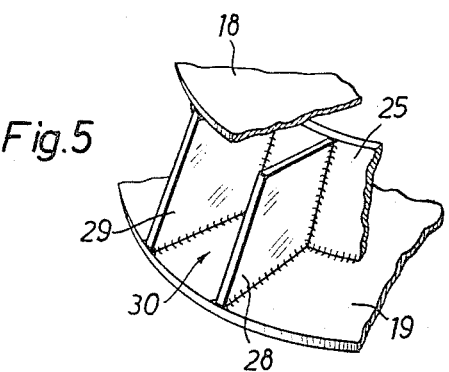

United States Patent Office 3,379,422
Patented Apr. 23, 1968

3,379,422
APPARATUS FOR THE PURIFICATION OF GASES BY WET SEPARATION
Paul Liesenhoff, Cologne-Braunsfeld, Germany, assignor to Artur Simon Maschinenbaugesellschaft mit beschrankter Haftung
Filed Nov. 23, 1964, Ser. No. 413,043
Claims priority, application Germany, Dec. 2, 1963, S 88,539
1 Claim. (Cl. 261—84)

The invention relates to an apparatus for the purification of gases by wet separation in which impure gas flows along a purification channel as a result of its kinetic energy produced by pressure drops, liquid particles are fed into the purification channel from outside, and cyclones are produced in the purification channel at the expense of the kinetic energy to provide a finely distributed mixture of liquid particles and impure gas, in which part of the impurities (dust, soluble gas components) are permanently bound to the liquid particles, whereupon at the outlet of the purification channel the liquid particles which have taken up the impurities are separated from the remaining gas by mass separation and the latter then leaves the purification channel as purified gas. This invention provides a considerable improvement in wet purification technique with respect both to the degree of purity obtained and to the size and cost of the equipment required.

Gases can be impure in several respects: they can, for example, be contaminated by reason of other gas components, as when industrial exhaust gases are contaminated with sulphur dioxide. Gases can also be impure by reason of liquid particles, e.g. the exhausted air in spray painting plants. Gases can also be contaminated with dust, e.g. exhaust gases from heating installations. The extraction of dust from these gases presents one of the most difficult problems with which present day technology is faced, particularly in thickly populated residential areas. Even in thinly populated areas, gas purification is still an unusually serious problem if for example exhaust gases are bacterially or radioactively contaminated. Various gas purification methods are known, e.g. gas washing, electrostatic dust extraction, cyclone separation, and in conjunction with these the process termed "wet dust extraction." All known dust extraction methods have the disadvantage that for adequate dust extraction such large and costly plants are necessary that dust extraction, for economic reasons, is either incomplete or not carried out at all. In spite of known dust extraction methods, wet dust extraction still seems the most tolerable from the point of view of expenditure and costs. Liquid is added in the most finely distributed form to the gas being freed from dust, whereupon the mixture made up of dust, liquid particles and gas flows through a cyclone in which a considerable proportion of dust, which binds itself permanently to the liquid particles, is separated off, so that a more or less dust-free gas emerges. The degree of dust extraction is not, however, satisfactory. Impurities in the form of gas components can hardly be separated by means of the known wet dust extraction process. Even impurities in dust or droplet form cannot be separated by the known wet dust separation methods if the particle or droplet size falls below a certain value. In addition, wet dust extraction methods of the above-mentioned type have the disadvantage that, because of the cyclone formation necessary for thorough mixing, they can only work under certain conditions and are not readily adaptable to large volumes of impure gases. The object of the invention is to overcome these disadvantages. It is also an object of the invention to produce a solution to the gas purification problem which is advantageous in every respect, i.e. to actually enrich technology.

The object is achieved according to the invention by the fact that when carrying out the previously described method, using this apparatus, a number of additional, very high energy cyclones are produced in the purification channel, and the energy necessary for their production is supplied from outside to the point where cyclone formation is taking place.

According to this method, an extraordinarily high degree of purification is obtained which cannot be achieved by known methods comparable in cost and construction. It is particularly surprising that with the purification method according to the invention, soluble gas components are also separated off to a considerable extent, so that in many cases separate washing of the gas is rendered superfluous, especially when the gas components to be removed are at all soluble in the liquid used so that the degree of purification obtained with the method of the invention is higher than with known gas washing methods. Finally, another very surprising effect of the invention is to be seen in the fact that impurities with a granule or droplet size of less than 1 micron, i.e. impurities within the colloid range, can also be reliably separated. With known gas purification methods under economic conditions of operation this had hitherto been impossible.

A proven explanation for the surprising effect of the method cannot at present be given. The following is, however, probably of significance: with wet purification separation is a matter of the liquid particles and impurity particles coming into contact with each other to the greatest possible extent, fine distribution and thorough mixing being essential thereto. Fine distribution and thorough mixing can, however, also be obtained with known wet dust extraction methods which nevertheless do not attain a high degree of dust extraction. If a higher degree of dust extraction is not obtained in spite of fine distribution and thorough mixing, it may be concluded that intimate and lasting intermixing of liquid particles and impurity particles does not occur to the extent required. It is therefore possible that with finely distributed liquid particles a particularly stable skin is formed by surface tension which skin resists the penetration into the liquid droplet of even immediately adjacent impurity particles. It is probably this disadvantage that is overcome according to the invention in that liquid particles and impurity particles are subjected to extraordinarily severe rupturing and collision forces that only become possible at all because of the fact that particularly vigorous cyclones are produced, whereby the necessary energy is supplied from the outside to the spot where cyclone formation is actually taking place. In known wet separation methods, the cyclones cannot be so vigorous in any case because the energy for cyclone formation must be taken in the form of cyclone losses from the kinetic energy of the gas flowing through the purification channel. With known methods, the kinetic energy of the gas regularly stems from the pressure drop which occurs between the inlet and the outlet of the purification channel and is produced either by heat expansion or by fan forced flow. The kinetic energy given to the gas in this manner then decreases constantly as a result of the cyclone losses in the purification channel, so that the energy content of the cyclone in the purification channel decreases constantly in the direction of flow. No noticeable improvement in the degree of dust extraction can be obtained by increasing the pressure drop in known wet dust extraction methods, if the operating costs are to be kept within economic limits. According to this invention, however, it is possible to supply extraordinarily high cyclone energy to the gas independently of the kinetic energy given to it to make it flow through the purification channel, and this is also possible with a purification channel of any desired length. For this reason it is possible with the method of the invention to produce high cyclone energy with economic operating costs and to provide purification channels of any required length, so that on the one hand because of the vigorous cyclones and on the other hand because of the possibility of producing as many of these vigorous cyclones as required in succession, practically any required degree of purification can be obtained. In addition, the method of the invention offers the possibility of adapting the gas purification plant quite easily to quantities of impure gas which vary very considerably. The possibility is due to the fact that the energy for the vigorous cyclones is supplid from outside to the spot where cyclone formaation is actually taking place, i.e. it is independent of the kinetic energy already given to the gas—and thus also of the amount of gas flowing through.

In the broad sense of this invention, there are various possibilities for supplying the energy from the outside to the point where cyclone formation is actually taking place. For example, secondary air nozzles could be provided where cyclone formation occurs, producing vigorous cyclones alone, or in conjunction with opposed secondary air nozzles or in conjunction with reflecting surfaces. However, it is proposed as particularly advantageous according to this invention that the energy for the additional cyclones should be supplied by large numbers of fast moving flow obstructions with sharp edges, in the purification channel, but driven from the outside. It was found that in this way the required vigorous cyclones can be produced in the most economic manner. It is also proposed as particularly advantageous according to the invention that the production of the additional cyclones should take place at the narrowest cross-section of the purification channel. In this way a particularly high degree of purification is obtained. The cyclones produced have very small spatial dimensions so that the particle velocities in the cyclones are particularly high and the particles collide even after a very short distance with other particles or reflecting surfaces.

For the execution of the method, a device proposed as particularly advantageous is one in which the purification channel is formed by a rotation-symmetric housing jacket which is closed on the inlet side by means of a cover with gas inlet connection and liquid feed connection and on the outlet side by means of a base with at least one outlet connection, while in the housing jacket a rotor is rotatably supported on an axis and driven by a motor, the rotor having sharp-edged flow obstructions on its periphery. In this way the problem of cyclone formation by means of localized supply of energy from outside is solved in the simplest mechanical manner.

A particular merit of the invention lies in the fact that for the execution of the method devices can be used which are themselves known, even if for a completely different purpose. The devices referred to are mills for grinding solids, with a rotor rotatably supported within a housing jacket and provided at its periphery with sharp edges. These mills are also called air flow mills. If mills of this type—diverted from their intended purpose—are to be used for the execution of the method according to the invention, it is proposed that the gas being purified and the liquid should be introduced at the material inlet connection whilst impure liquid particles and purified gas is led off from the ground material discharge connection. In principle the operation is carried out according to the method of the invention. The use of such mills for wet purification is therefore expressly included in the invention.

For new plants being set up solely for wet purification, it seems more economic and also more advantageous from the technical standpoint to construct special devices which are designed in every respect purely for wet purification and are not intended for or cannot be used for other purposes, e.g. comminuting. For reasons of rigidity and wear a special wet purification apparatus according to the invention will be less expensive than a mill, thus increasing the economy of wet purification compared with the use of an air flow mill.

The method and apparatus according to the invention is described below with reference to the attached drawings by means of sample embodiments of devices according to the best mode of accomplishing the invention.

In the drawings:

FIG. 3 is a partial sectional view through the wet purification apparatus of FIG. 2;

FIG. 4 shows a section along the line 4—4 in FIG. 3;

FIG. 5 shows a view of part of the rotor in FIGS. 3 and 4, in perspective and partly broken open; and FIG. 6 shows the retaining and bearing arrangement for the rotor of FIGS. 3, 4 and 5, partly in section.

Figure 1:
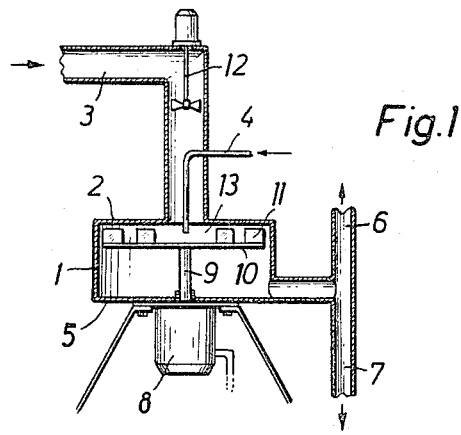
FIG. 1 shows in diagrammatic form a simple wet purification apparatus for the execution of the method according to the invention.
Figure 2:
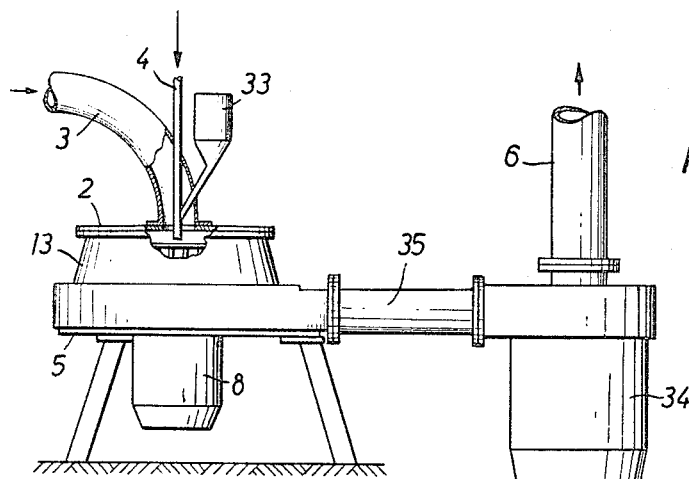
FIG. 2 shows in elevation with a portion in section a particularly advantageous embodiment for a wet purification apparatus in conjunction with a cyclone.

In the apparatus according to FIG. 1, the purification channel consists essentially of a cylindrical housing jacket 1 which is closed on the inlet side by means of a cover 2 with gas inlet connection 3 and liquid feed connection 4. On the outlet side the housing jacket 1 is closed by means of a base 5 with a gas outlet connection 6 and a liquid particle outlet connection 7. In the housing jacket 1, a rotor 10 is rotatably supported on an axle 9 driven by a motor 8, having on its periphery sharp-edged flow obstructions in the form of radial blades 11. The radial blades 11 move in the narrowest cross-section of the purification channel. In the gas inlet connection 3, an electrically driven fan 12 is also provided which, by producing a pressure drop, gives the gas being purified so much kinetic energy that it flows through the purification channel.

During wet purification, the fan 12 and the motor 8 are switched on. Liquid is then fed through the liquid feed inlet 4 to the middle of the rotor 10. Because of the friction between the liquid and/or the gas and the rotor 10, liquid and gas are hurled substantially radially outwards by the action of the centrifugal force. The liquid is thereby broken down into small volumes of liquid and to a certain extent atomized, so that in the premixing chamber 13 situated above the rotor 10 a finely distributed mixture of impure gas and liquid particles is already formed. If this mixture, by the action of centrifugal force, reaches the vicinity of the blades 11, the sharp edges of the rotating blades 11 in the narrow cross-section of the purification channel produce a great many vigorous local cyclones. In these very vigorous cyclones, many impurity particles become permanently combined with liquid particles. The mixture is then forced downwards through the gap between rotor 10 and housing jacket 1, whereby the liquid particles for the greater part flow downwards together with the bound impurities in the form of a liquid film on the inner wall of the housing jacket 1. From the gas outlet connection 6 emerges purified gas, while impure liquid flows from the liquid outlet socket 7.

In this way, undesirable gas components, such as dust and chemically, bacterially or radioactively contaminated gas impurities can be separated off. The liquid fed through the liquid inlet connection 4 depends on the case in question. Water can be used for most applications. If water cannot be used for any reason, however, other liquids such as oil for example can be used. The use of other liquids is in fact to be preferred if, for example, the dust being extracted combines more easily with oil than with water.

The embodiment according to FIG. 1 can, of course, be used for the execution of the method of this invention.

But considerably better results are obtained with an embodiment according to FIGS. 2 to 6. The great advantages of the latter embodiment include the fact that a number of cyclone-producing edges are provided on the rotor, whereby these edges in conjunction with vacuum chambers and an otherwise multi-stage arrangement produces a particularly high degree of purification.

In this embodiment housing jacket 1 is conical, and widens out at the bottom. The result of this is firstly that the liquid particles centrifuged by the rotor 14 are driven in the direction of the base 5, a result which was not guaranteed to such an extent by gas flow alone that liquid dew was prevented in the narrow gap between rotor 14 and housing jacket 1. The conical construction of the housing jacket 1 therefore makes it possible to produce a particularly narrow gap between rotor 14 and housing jacket 1. The conical construction of the housing jacket 1 in conjunction with the conical construction of the rotor 14 also makes it possible for the gap width between rotor 14 and housing jacket 1 to be adjustable. For this purpose, the rotor 14 is made axially displaceable with respect to the housing jacket 1, not shown. by regulating the gap width, an optimum relationship can be achieved between degree of purification and consumption.

The rotor 14 is made up of several discs 15, 16, 17, 18, 19, FIG. 3, arranged at a distance from each other, whereby the lower disc in each case has a larger diameter than the one above it. The discs are arranged on a disc support 20, FIG. 6, which in turn is firmly connected to the axle 9 and is supported together with the latter in bearing column 21 which fits on the base 5. The topmost disc 15 is constructed as a full disc and attached to the topmost stage 22 of the disc support 20. The discs situated below it, 16 to 19, are constructed as ring discs and fit on the corresponding stepped stages of the disc support 20, e.g. disc 19 on stage 23. Between each pair of discs 15/16, 16/17, 17/18 and 18/19 there is a ring in the form of a truncated cone, e.g. between discs 15/16 the ring 24 and between discs 18/19 the ring 25, see FIG. 5. The annular chambers between the discs 15 to 19 produced in this manner and open to the outside are divided by means of radial cyclone blades, e.g. 26, 27 or 28, 29 into cells 30, FIG. 5, which are only open to the outside. These cells 30 act in operation as vacuum cells to a certain degree. At high rotative speed of the rotor 14, the air is forced from the vacuum cells 30 in an outward direction so that the vacuum in the cells 30 facilitates considerably the formation and the peripheral speed of the cyclones which form behind the edges 26, 27 or 28, 29 as the rotor 14 turns. Fan blades 31 are fitted to the lowest disc 19 to produce the pressure drop that causes the gas to flow through the purification channel.

The housing jacket 1 is provided with a grooved or rippled liner 32. The result is thereby obtained that the contact between the flowing gas and liquid particles is increased and that the impact of the gas and liquid particles on the stator 1, 32 is greater. Both factors facilitate the formation of the cyclone as much as the increase in the energy released on impact, so that the probability of permanent combination of impurity particles with liquid particles is increased.

The liquid feed pipe 4 is directed towards the vicinity of the support for the rotor 14. The bearing assembly which is only shown diagrammatically and in a simplified form, in FIG. 6, is situated in the middle of the rotor and reaches to just below the upper end of the rotor. By means of the described arrangement of the liquid feed pipe 4, cooling of the rotor bearing assembly is achieved simultaneously. This is particularly important if hot gases, e.g. hot exhaust gases, are being purified. The hot gases would otherwise place an excessive load on the rotor bearing assembly because of the heating-up of the latter, for which reason previous cooling of the hot gases would be necessary. But if the rotor bearing assembly is cooled by means of the liquid being fed in, pre-cooling of the hot gases becomes superfluous.

A measuring tank 33 is also connected to the liquid feed pipe 4 into which additives can be introduced which must be present during the gas purification process. With the embodiment according to FIG. 2, the actual purification apparatus according to the invention has connected to it a known cyclone 34 which has the gas outlet 6 at the top and the liquid outlet 7 at the bottom. The arrangement with cyclone 34 is advantageous if the gas present in the connecting pipe 35 still carries with it a great deal of liquid in atomized form.

In order to achieve particularly good distribution and atomization of the liquid in the premixing chamber 13, it is advisable for several radial strips 36 to be attached to the top disc 15 to break down mechanically and atomize the liquid guided on to the disc 15.

In FIG. 3, the motor 8 and the axle 9 are not shown. Only the axle bore 37 and a threaded hole 38 for attachment of the motor 8 can be seen. For reasons of greater clarity, only one each of the strips 36 and the fan blades 31 are shown.

The apparatus according to the invention should operate at such rotor speeds that in the vacuum chambers or cells 30, cyclones with high peripheral speeds of approximately 500 to 1000/meters/second are formed. According to current experience, this is achieved if the rotor reaches peripheral speeds of 110 to 140 meters/second. It is to be assumed that in the embodiment according to FIGS. 2 to 6, not merely the cyclone formation alone produces the favorable result, but also the constant and very rapid exchange between low and high pressure, or the quick succession of build-up and break-down of cyclones, as produced by the number of separate vacuum chambers or cells 30.

According to the invention, 99 to 100% separation of dust and also of colloids and low molecular dispersions such as $SO_2$ is possible.

The result of a practical dust extraction operation according to the invention under industrial conditions is shown. The gas purification plant was connected to an annealing drum in which lithopones were being handled:

| Incidence of dust | Before dust extraction | After dust extraction |
| --- | --- | --- |
| Mg./100 liters | 669 | 0 |
| G./hour | 2,542 | 0 |
| Kg./24 hours | 61.0 | 0 |
| Particle size in microns | 0.001–0.1 | |
| Composition in percent: | | |
| $ZnCl_2$ (zinc chloride) | 33.6 | 0 |
| $NH_4Cl$ (ammonium chloride) | 23.6 | 0 |
| ZnS (zinc sulphide) | 29.2 | 0 |
| $BaSO_4$ (barium sulphate) | 13.6 | 0 |
| | 100.0 | |
| $SO_2$, mg./100 liters | 160 | 64 |

In this practical dust extraction operation, the dust and colloids were completely separated. The $SO_2$ present was combined with the washing water to the extent of 60%. Such a result was hitherto impossible to achieve in an economic manner.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the invention, therefore, to be limited only as indicated by the scope of the following claim.

What is claimed is:

1. An apparatus for wet dust separation comprising a rotational symmetrical housing jacket having an inlet side and an outlet side, a cover with a gas inlet connection and a liquid feed connection for the inlet side of the housing jacket, a base with at least one outlet connection for the outlet side of the housing jacket, a rotor rotatably supported within the housing jacket, a motor for driving the rotor at high speeds, the rotor constructed from a plurality of spaced apart discs each cooperating pair of which are separated by an annular partition, each annular partition mounted on the rotor in proximity to the housing jacket and being of lesser diameter than the housing jacket, vertical sharp edged flow obstructing blades mounted in spaced apart fashion on the periphery of the rotor between the spaced apart discs, the blades extending radially outward from the annular partitions to the peripheral edge of the rotor, the vertical blades engaging the annular partitions so as to partially define a plurality of outwardly open faced chambers arranged on the periphery of the rotor between cooperating pairs of spaced apart discs, wherein the vertical sharp edged blades form flow obstructions along flow paths thereby creating a vortex within the separate chambers during rotation of the rotor.

References Cited

UNITED STATES PATENTS

| | | | |
|---|---|---|---|
| 217,294 | 7/1879 | North | 55—91 |
| 1,095,835 | 5/1914 | Fiddes | 261—84 |
| 1,510,353 | 9/1924 | Turner | 55—91 X |
| 2,166,772 | 7/1939 | Serra | 261—89 X |

FOREIGN PATENTS

| | | |
|---|---|---|
| 153,814 | 8/1904 | Germany. |
| 193,260 | 12/1907 | Germany. |
| 334,836 | 3/1921 | Germany. |
| 746,815 | 12/1944 | Germany. |
| 31,770 | 12/1961 | Finland. |

REUBEN FRIEDMAN, *Primary Examiner.*

J. ADEE, *Assistant Examiner.*